3,009,931
6α-FLUORO-9α,11β,21-TRIHALO-PROGESTERONE
Hans Reimann, Bloomfield, and David H. Gould, Leonia,
N.J., assignors to Schering Corporation, Bloomfield,
N.J., a corporation of New Jersey
No Drawing. Filed June 1, 1959, Ser. No. 817,053
10 Claims. (Cl. 260—397.3)

This invention relates to novel and therapeutically useful halogenated steroids and to methods for their manufacture. In particular, this invention relates to 6,21-disubstituted-9α,11β-dihalogenated derivatives of progesterone which exhibit valuable progestational properties.

Our novel compounds may be represented by the following formula:

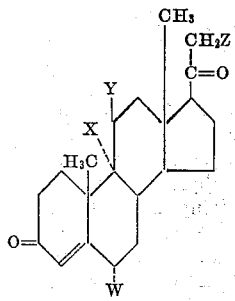

wherein W is fluorine; X is a halogen having an atomic weight greater than 19; Y is a halogen having an atomic weight less than 126 and being at least as electronegative as X; Z is halogen, preferably fluorine or iodine; the 19-nor and the 1-dehydro analogs thereof. These novel compounds are thus 6,9,11,21-tetrahalogenated analogs of progesterone, 19-nor-progesterone and 1-dehydroprogesterone.

In the above formula, the halogen at C–11 must be at least as electronegative as the halogen present in the 9α-position (fluorine being the most electronegative halogen, and iodine the least electronegative and further cannot be iodo. Thus, a progesterone of our invention containing a 9α-chloro group may possess an 11β-chloro or an 11β-fluoro group, but cannot contain an 11β-iodo or 11β-bromo group. This artificial restriction as to the electronegativity of the 9- and 11-substituents is necessarily imposed in view of the limitations of the manufacturing process developed below.

Typical progestins embraced by the general formula are 6α,21-difluoro-9α,11β-dichloroprogesterone, 6α-fluoro-9α,11β-dichloro-21-iodoprogesterone, 6α,11β,21-trifluoro-9α-bromoprogesterone, 6α,11β,21-trifluoro-9α-iodoprogesterone, as well as their 1-dehydro analogs. Although all of our compounds are, in general, valuable progestins, the 21-fluoroprogesterones of the general formula are the preferred species and, in particular, 6α,21-difluoro-9α,11β-dichloroprogesterone.

Our novel compounds are prepared by reacting a 4,9(11)-pregnadiene-3,20-dione substituted at the 6-carbon by fluorine and at the 21-carbon preferably by fluorine or iodine (or a similarly substituted 1,4,9(11)-pregnatriene-3,20-dione) with a suitable halogenating agent. Thus the starting compounds utilized in this invention are exemplified by compounds such as 6α,21-difluoro-4,9(11)-pregnadiene - 3,20-dione, 6α-fluoro-21-iodo-4,9(11)-pregnadiene-3,20-dione, as well as the 1-dehydro analogs of the foregoing. The starting materials thus necessarily possess a Δ⁹,¹¹-bond, and are prepared by a combination of processes analogous to those described in the literature.

Our 9(11)-dehydro intermediates are also prepared from 11β-hydroxypregnane derivatives. For example, 6α - fluoro - 21 - iodo-4,9(11)pregnadiene-3,20-dione (6α-fluoro-21-iodo-9(11)-dehydroprogesterone) is prepared from 6α - fluoro-11β,21-dihydroxy-4-pregnene-3,20-dione (6α-fluorocorticosterone) by an initial dehydration as effected by reagents such as methanesulfonyl chloride in the presence of pyridine or phosphorus oxychloride in pyridine which yields, if methanesulfonyl chloride is the reagent used, 6α-fluoro-21-hydroxy-4,9(11)-pregnadiene-3,20-dione 21-methanesulfonate. Upon treatment of this 21-ester with, for example, sodium iodide in acetone, there is obtained the intermediate 6α-fluoro-21-iodo-4,9(11)-pregnadiene - 3,20-dione (6α-fluoro-21-iodo-9(11)-dehydroprogesterone). The 21-fluoro-9(11)-dehydro intermediates, 6α,21 - difluoro-4,9(11)-pregnadiene-3,20-dione and 6α-methyl-21-fluoro-4,9(11)-pregnadiene-3,20-dione, are conveniently obtained from their corresponding 21-iodo compounds by the action of, for example, silver fluoride in moist acetonitrile. The 1-dehydro intermediates, i.e. the 6,21-difluoro-1,4(11)-pregnatriene-3,20-diones (6,21 - difluoro - 1,9(11)-bisdehydroprogesterones), and 6 - fluoro-21-iodo-1,4,9(11)-pregnatriene-3,20-diones (6 - fluoro-21-iodo-1,9(11)-bisdehydroprogesterones) are prepared from the 6-fluoro-21-iodo-9(11)-dehydroprogesterones and the 6,21-difluoro-9(11)-dehydroprogesterones by microbiological dehydrogenation with an organism such as for example, Corynebacterium simplex (A.T.C.C. 6946) in a manner similar to that described in U.S. Patent No. 2,837,464, or by chemical dehydrogenation through the use of such reagents as chloranil or selenium dioxide.

Halogenating agents suitable for use in our process are:

(1) Molecular halogens having a molecular weight greater than 38 and less than 253. This class includes heteroatomic halogen molecules such as iodine monochloride as well as isoatomic halogen molecules such as chlorine and bromine. The molecular halogen employed may be used alone or in admixture with a halide anion. In reactions employing isoatomic molecular halogens, an anion corresponding to the molecular halogen is used. For example, in reactions using molecular chlorine, a suitable chloride salt such as lithium chloride or hydrochloric acid are suitable anion sources. In reactions which employ a heteroatomic molecular halogen, a source of the more electronegative anion is used, i.e. a suitable chloride salt or hydrochloric acid is used in a reaction employing iodine monochloride.

(2) Addition compounds of molecular halogens, said molecular halogens having a molecular weight greater than 38 and less than 253. Examples of such addition compounds are pyridinium bromide perbromide, pyridinium chloride perchloride, dioxane dibromide, iodobenzene dichloride, and the like.

(3) N-haloamides in admixture with a halide anion, the halogen in the halide being at least as electronegative as the halogen cation in the N-haloamide, and the combined molecular weight of said halogens being greater than 38 and less than 253. N-haloamides used in these mixtures are such as N-chlorosuccinimide, N-bromoacetamide, dimethyl - N - N - dibromohydantoin, N-iodosuccinimide and the like. Examples of mixtures of N-haloamide and a halide are such as N-chlorosuccinimide and hydrogen chloride; N-bromoacetamide and hydrogen bromide; N-bromoacetamide and lithium chloride; N-bromoacetamide and hydrogen fluoride; N-iodosuccinimide and sodium chloride. These mixtures may have more than one source of halide ion such as in the reagent combination N-chlorosuccinimide, hydrogen chloride and lithium chloride.

Molecular halogens (both isoatomic and heteroatomic) such as chlorine, bromine and iodine monochloride, and molecular halogen addition compounds such as iodobenzene dichloride or pyridinium bromide perbromide employed in our process may be used directly in their commercially available form, in which case they are added directly to the reaction mixture either alone or in a suitable non-reacting solvent such as acetic acid or tetrahydrofuran. The halogenating agent is preferably used in approximately equivalent quantities to that of the steroid.

Alternatively, the halogenating reactant may be prepared in situ. For example, 0.9–1.2 equivalents of halogen cation (based on the amount of steroid) such as is obtained from N-bromosuccinimide is added to a reaction mixture containing a halogen anion of greater or equal electronegativity than the cationic reagent. The halogen anion may be supplied by a hydrohalic acid or by a salt such as sodium bromide, lithium chloride, potassium fluoride, or by mixtures of a hydrohalic acid with an alkali metal halide. Whenever an acid is the source of a halogen anion, approximately theoretical quantities are generally used; whereas if a salt is used as the halogen anion source it may be present in large excess. Such an excess of anion is frequently useful to obtain an increased yield or greater purity of product.

Thus, each of our novel compounds may be prepared by any one of several methods. For example, $6\alpha,21$-difluoro-$9\alpha,11\beta$-dichloroprogesterone may be prepared from $6\alpha,21$-difluoro-9(11)-dehydroprogesterone by utilizing such reagents and combinations as: (1) chlorine and lithium chloride, (2) N-chlorosuccinimide and lithium chloride, (3) sodium chloride, N-chlorosuccinimide together with hydrogen chloride, (4) chlorine alone, (5) chlorine and hydrogen chloride, and (6) iodobenzene dichloride.

Our process, whereby a 6,21-disubstituted-9(11)-dehydroprogesterone is converted to a 6,21-disubstituted-$9\alpha,11\beta$-dihalogeno derivative, is generally carried out in the presence of a non-reacting solvent at temperatures ranging from 5° C. to 50° C. with reaction times varying from one-half hour to 24 hours, depending on the reagents involved. It is preferred that the halogen cation source be present in amounts of 0.9–1.2 equivalents based upon the amount of steroid. The choice of solvent in each reaction is naturally determined by the solubility of the reactants in the process. A preferred reaction condition employs glacial acetic acid as the sole or major solvent with the reaction being carried out at room temperature for a period of approximately two hours.

Although glacial acetic acid is frequently the preferred solvent, other solvents are used in our dihalogenation process either alone or in combination with acetic acid. Other solvents which may be employed include lower aliphatic acids such as propionic and diethylacetic, halogenated hydrocarbons such as methylene chloride and chloroform, saturated ethers such as tetrahydrofuran and dioxane, and inert solvents such as dimethylsulfoxide, as well as suitable mixtures of these solvents.

Further, when carrying out the above described process in a halogenated hydrocarbon solvent such as methylene chloride, chloroform or carbon tetrachloride, the yield and purity of the dihalogenated progesterone obtained is greatly increased by adding pyridine to the reaction mixture. Preferably up to ten equivalents of pyridine are added and usually one to four, based on the amount of steroid being converted. Other organic basic agents which may also be used in conjunction with a halogenated hydrocarbon solvent are aromatic tertiary amines such as lutidine, collidine, alkyl substituted pyridines and the like. The reaction is usually carried out initially at −20° C. with subsequent warming to about room temperature. The reaction time may be as short as five minutes or as long as several hours. In general, the optimum reaction time is about one hour.

Our process whereby a 6,21-disubstituted-9(11)-dehydroprogesterone is converted to a 6,21-disubstituted-$9\alpha,11\beta$-dihalogenoprogesterone is also applicable to 6,21-disubstituted-9(11)-dehydro-19-norprogesterones. With the aforementioned 9(11)-dehydro-19-norprogesterones there are produced the novel progestational agents, 6-W-$9\alpha$-X-$11\beta$-Y-21-Z-19-norprogesterones wherein W, X, Y and Z are as heretofore described. Thus, 6,21-difluoro-4,9(11) - 19 - norpregnadiene-3,20-diones (6,21-difluoro-9(11)-dehydro-19-norprogesterones), and 6 - fluoro-21-iodo-4,9(11)-19-norpregnadiene-3,20-diones (6-fluoro-21-iodo-9(11)-dehydro-19-norprogesterones) when reacted with chlorine in carbon tetrachloride in the presence of pyridine, for example, are converted to their respective $9\alpha,11\beta$-dichloro-derivatives. The necessary intermediates, i.e. the 6,21-disubstituted-9(11)-dehydro-19-norprogesterones are prepared by using procedures analogous to those known in the art. 19-norprogesterone is treated with ethylene glycol by known procedures to form the 3,20-bisethylene ketal derivative which, in turn, is epoxidized on treatment with, for example, monoperphthalic acid to give $5\alpha,6\alpha$-epoxy-19-norpregnane-3,20-dione 3,20-bisethylene ketal. From this epoxy intermediate the 6-fluoro substituent is introduced into the 19-norpregnane nucleus, using techniques described in the literature. Thus, the action of hydrofluoric acid on the epoxy bisethylene ketal intermediate simultaneously hydrolyzes the bisethylene ketal groups, and opens the epoxy ring, yielding $5\alpha$-hydroxy-$6\beta$-fluoro-19-norpregnane-3,20-dione. A reagent such as ethanolic hydrochloric acid on these $5\alpha$-hydroxy-$6\beta$-substituted-19-norpregnanes simultaneously dehydrates the hydroxy group and epimerizes the $6\beta$-constituent to yield $6\alpha$-fluoro-19-norprogesterone. A 21-iodo group is introduced into the 6-substituted-19-norprogesterones thus prepared by means of iodine and calcium oxide as described heretofore, yielding the disubstituted-19-norporgesterones. The 21-iodo compounds are easily converted to the corresponding 21-fluoro intermediates by means of a reagent such as silver fluoride in moist acetonitrile yielding the intermediate. The double bond between C–9 and C–11 is then introduced into the 6,21-disubstituted-19-norprogesterones through the corresponding 11-hydroxy derivative which is prepared, for example, by means of a microorganism such as *Curvularia lunata* (N.R.R.L. 2380) according to procedures analogous to those described in U.S. Patent No. 2,658,023. The 6,21-disubstituted-11-hydroxy-19-norporgesterone thus prepared is dehydrated by procedures described heretofore to give the necessary intermediates, $6\alpha$,21-difluoro-9(11)-dehydro-19-norprogesterone, $6\beta$,21-difluoro-9(11)-dehydro-19-norprogesterone, $6\alpha$-fluoro - 21 - iodo-9(11)-dehydro-19-norprogesterone, $6\beta$-fluoro-21-iodo-9(11)-dehydro-19 - norprogesterone.

Our novel dihalogenated progesterones, their 1-dehydro and their 19-nor analogs are active progestational agents by both oral and intramuscular routes, being specific in their action and devoid of androgenic, estrogenic or corticoid activity. That our compounds have progestational activity at all is surprising in view of the art which teaches that the introduction of substituents into the C-ring of progesterone and its derivatives, such as for example, $11\beta$-hydroxyprogesterone and the acetate thereof, eliminates progestational activity or reduces it to such an extent that the compounds are useless for therepeutic purposes. Our C-ring halogen substituted progesterones, on the other hand, are significantly more active than progesterone by the intramuscular route. Orally our compounds are comparable in activity to ethisterone, the known standard progestational agent.

In addition to being active both orally and intramuscularly, our halogenated progestins possess the added advantage of having a minimum effect on water, sodium and potassium metabolism. Thus, they may be administered without causing the usual side effects associated with electrolyte imbalance.

Our therapeutically active compounds are useful for the treatment of conditions requiring progestational agents such as the maintenance of pregnancy, or treatment of functional dysmenorrhea, premenstrual tension, habitual or threatened abortion. When administered orally, our compounds are preferably used in the form of tablets containing from 10 to 100 mg. together with the excipients such as starch or milk sugar. For subcutaneous and intramuscular administration, solutions or suspensions of our compounds with a non-toxic liquid vehicle are used. The dosage required may vary with the indications being treated and may range from about 10 to 25 mg. daily.

Our halogenated progestins are also valuable in the veterinary field for treating conditions in both large and small animals which require a progestational agent. In breeding animals, for example, our compounds are useful in preventing threatened abortion. Additional uses are in controlling egg and milk production by regulating the cycle of chickens and cows by the administration of our progestational agents.

The following examples are illustrative of the procedures employed in preparing the compounds of this invention, but are not to be construed as limiting the scope thereof; the scope of our invention being limited only by the appended claims.

EXAMPLE 1

*6α-fluoro-21-iodo-4,9(11)-pregnadiene-3,20-dione*

A. 6α-FLUORO-21-HYDROXY-4,9(11)-PREGNADIENE-3,20-DIONE 21-METHANESULFONATE

A solution of 5 g. of 6α-fluoro-11β,21-dihydroxyprogestrone in 100 ml. of pyridine is chilled to 0° C. and a solution of 10 ml. of methanesulfonyl chloride in 20 ml. of chloroform is added dropwise. The mixture is allowed to stand in the ice box for 100 hours, then a little ice is added and the solution diluted with chloroform. The organic solution is washed with water, 5% hydrochloric acid, 5% aqueous sodium bicarbonate, and again with water. The solution is dried over magnesium sulfate, filtered and concentrated in vacuo to a residue which is crystallized twice from acetone-hexane to give 6α-fluoro-21-hydroxy-4,9(11)-pregnadiene-3,20-dione 21-methanesulfonate.

B. 6α-FLUORO-21-IODO-4,9(11)-PREGNADIENE-3,20-DIONE

Five grams of 6α-fluoro-21-hydroxy-4,9(11)-pregnadiene-3,20-dione (the compound of Example 1A) is dissolved in 50 ml. of acetone containing a few drops of pyridine. The solution is warmed slightly and there is added a warm solution of 10 g. of sodium iodide in 20 ml. of acetone. The reaction mixture is warmed on the steam bath, then poured into cold water. A solid precipitates which is filtered, washed with water and crystallized from acetone-hexane to give 6α-fluoro-21-iodo-4,9(11)-pregnadiene-3,20-dione.

EXAMPLE 2

*6α-fluoro-9α,11β-dichloro-21-iodoprogesterone*

500 mg. of 6α-fluoro-21-iodo-4,9(11)-pregnadiene-3,20-dione is reacted with 80 mg. of chlorine in carbon tetrachloride in the presence of 0.1 ml. of pyridine by dissolving the steroid in 15 ml. of carbon tetrachloride and adding thereto at −20° C. a solution of the chlorine reactant in 1 ml. of carbon tetrachloride containing the pyridine. The mixture is stirred at −20° C. for 15 minutes, then allowed to warm to room temperature over a period of one-half hour. The solution is filtered and the filtrate concentrated in vacuo to a residue which is crystallized from acetone-hexane to give 6α-fluoro-9α,11β-dichloro-21-iodoprogesterone.

EXAMPLE 3

*6α,21-difluoro-4,9(11)-pregnadiene-3,20-dione*

Five grams of 6α-fluoro-21-iodo-4,9(11)-pregnadiene-3,20-dione is reacted with 1.5 g. of silver fluoride in moist acetonitrile by dissolving the steroid in 100 ml. of acetonitrile containing 1 ml. of water and adding thereto a 50% aqueous solution of the silver fluoride. The mixture is warmed to 30–40° C. for 4 hours, then filtered and the filtrate poured into water. The resultant suspension is filtered and crystallized from acetone-hexane to give 6α,21-difluoro-4,9(11)-pregnadiene-3,20-dione.

EXAMPLE 4

*6α,21-difluoro-9α,11β-dichloroprogesterone*

One gram of 6α,21-difluoro-4,9(11)-pregnadiene-3,20-dione is reacted with 400 mg. of N-chlorosuccinimide in the presence of hydrogen chloride and lithium chloride by cooling to about 10° C. a solution of the steroid in 50 ml. of glacial acetic acid containing 4 g. of lithium chloride, adding thereto a solution of 250 mg. of hydrogen chloride in 1 ml. of tetrahydrofuran followed by the N-chlorosuccinimide. The solution is stirred at room temperature for 20 minutes in the absence of light, then is poured into ice water with stirring. A precipitate forms which is filtered, washed with water, triturated with ether and crystallized from acetone-hexane to give the product of this example.

EXAMPLE 5

*6α,11β,21-trifluoro-9α-bromoprogesterone*

One gram of 6α,21-difluoro-4,9(11)-pregnadiene-3,20-dione is dissolved in 50 ml. of diethylacetic acid and there is added a solution of 1.2 g. of hydrogen fluoride in 5 ml. of a chloroform-tetrahydrofuran mixture followed by 410 mg. of N-bromoacetamide. The solution is stirred at room temperature for 1½ hours, poured into an aqueous potassium carbonate solution with vigorous stirring and then is extracted with methylene chloride. The organic extracts are combined, washed with 5% aqueous sodium hydroxide and then with water, dried over magnesium sulfate, filtered and concentrated to a residue which is crystallized from methylene chloride-hexane to give 6α,11β,21-trifluoro-9α-bromoprogesterone.

EXAMPLE 6

*6α,21-difluoro-9α,11β-dibromoprogesterone*

500 mg of 6α,21-difluoro-4,9(11)-pregnadiene-3,20-dione is reacted with 205 mg. of N-bromoacetamide and 120 mg. of hydrogen bromide in the presence of lithium bromide by dissolving the steroid and 2 g. of lithium bromide in 25 ml. of acetic acid and adding thereto the N-bromoacetamide followed by a solution of the hydrogen bromide in 2.2 ml. of acetic acid. The mixture is stirred at room temperature for one hour, then poured into ice water. A solid precipitates which is filtered, washed with water and crystallized from methylene chloride-pentane to give the compound of this example.

EXAMPLE 7

*6α,11β,21-trifluoro-9α-iodoprogesterone*

One gram of 6α,21-difluoro-4,9(11)-pregnadiene-3,20-dione and 6 g. of potassium fluoride are dissolved in 50 ml. of dimethylsulfoxide and there is added 612 mg. of N-iodosuccinimide. The reaction mixture is stirred at room temperature for sixteen hours, poured into ice-water with stirring, and extracted with methylene chloride. The organic extracts are treated with decolorizing carbon and concentrated in vacuo to a residue which is chromatographed on silica gel. The fraction eluted with 40% ether-in-hexane yields 6α,11β,21-trifluoro-9α-iodoprogesterone.

EXAMPLE 8

*6α-fluoro-21-iodo-1,4,9(11)-pregnatriene-3,20-dione*

Five grams of 6α-fluoro-21-iodo-4,9(11)-pregnadiene-3,20-dione (the compound of Example 1B) is fermented with *Corynebacterium simplex* (A.T.C.C. 6946) according to the procedure of U.S. Patent No. 2,837,464 as follows.

A 100 ml. broth culture containing a 0.1% yeast extract concentration, 9.0 ml. of 0.2 M $KH_2PO_4$ and 9.0 ml. of 0.2 M $Na_2HPO_4$, contained in a 300 ml. Erlenmyer flask, is seeded with 1 ml. of a 24-hour broth culture of *Corynebacterium simplex* (A.T.C.C. 6946). The flask is incubated at 28° C. for 24 hours. A second 300 ml. Erlenmyer flask containing 150 mg. of sterile 6α-fluoro-21-iodo-4,9(11)-pregnadiene-3,20-dione in 5.0 ml. acetone is inoculated with the 24 hour culture of *Corynebacterium simplex* (A.T.C.C. 6946). The culture-containing steriod solution is incubated for 48 hours at 28° to 30° C.

After termination of the transformation period, the pH is 7.2–7.3. The culture is now directly extracted with 3 equal volumes of $CHCl_3$, the solvent volumes combined and concentrated on a steam bath to a residue which is crystallized from acetone-hexane to give 6α-fluoro-21-iodo-1,4,9(11)-pregnatriene-3,20-dione. Similarly, 6α,21-difluoro-4,9(11)-pregnadiene-3,20-dione (the compound of Example 3) when subjected to the action of *Corynebacterium simplex* yields the corresponding 1-dehydro analog.

EXAMPLE 9

*6α-fluoro-9α,11β-dichloro-21-iodo-1,4-pregnadiene-3,20-dione*

One gram of 6α-fluoro-21-iodo-1,4,9(11)-pregnatriene-3,20-dione, prepared from the compound of Example 1 in the manner described in Example 8, is chlorinated with 160 mg. of chlorine in carbon tetrachloride in the presence of 0.25 ml. of pyridine in the manner described in Example 2. The resultant product is isolated and purified in the described manner to give 6α-fluoro-9α,11β-dichloro-21-iodo-1,4-pregnadiene-3,20-dione.

Alternatively, by subjecting 6α-fluoro-9α,11β-dichloro-21-iodo-progesterone to the action of *Corynebacterium simplex* in the manner described in Example 8, there is obtained 6α-fluoro-9α,11β-dichloro-21-iodo-1,4-pregnadiene-3,20-dione.

EXAMPLE 10

*6α,21-difluoro-9α,11β-dichloro-1,4-pregnadiene-3,20-dione*

One gram of 6α,21-difluoro-1,4,9(11)-pregnatriene-3,20-dione, prepared from the compound of Example 3 by the procedure of Example 8, is reacted with 400 mg. of N-chlorosuccinimide in the presence of hydrogen chloride and lithium chloride according to the procedure of Example 4. The resultant product is isolated and purified in the described manner to give 6α,21-difluoro-9α,11β-dichloro-1,4-pregnadiene-3,20-dione.

Alternatively, 6α,21-difluoro-9α,11β-dichloroprogesterone (the compound of Example 4) is subjected to the action of a culture of the microorganism *Corynebacterium simplex* in the manner described in Example 8 to give 6α,21-difluoro-9α,11β-dichloro-1,4-pregnadiene-3,20-dione.

In a similar manner, the compounds of Examples 5, 6 and 7 are subjected to the action of a culture of *Corynebacterium simplex* to give 6α,11β,21-trifluoro-9α-bromo-1,4-pregnadiene-3,20-dione. 6α,21-difluoro-9α,11β-dibromo-1,4-pregnadiene-3,20-dione, and 6α,11β,21-trifluoro-9α-iodo-1,4-pregnadiene-3,20-dione.

We claim:

1. Compounds of the group consisting of 6α-fluoro-9α-X-11β-Y-21-Z-progesterones, 6α-fluoro-9α-X-11β-Y-21-Z-19-norprogesterones, and 6α-fluoro-9α-X-11β-Y-21-Z-1-dehydroprogesterones wherein X is a halogen having an atomic weight greater than 19; Y is a halogen having an atomic weight less than 126 and being at least as electronegative as X; and Z is halogen.

2. 9α-X-11β-Y-21-Z-6α-fluoroprogesterone wherein X is a halogen having an atomic weight greater than 19; Y is a halogen having an atomic weight less than 126 and being at least as electronegative as X; and Z is halogen.

3. 9α-X-11β-Y-21-Z-6α-fluoro-1-dehydroprogesterone wherein X is a halogen having an atomic weight greater than 19; Y is a halogen having an atomic weight less than 126 and being at least as electronegative as X; and Z is halogen.

4. 6α,21-difluoro-9α,11β-dichloroprogesterone.

5. 6α,21-difluoro-9α,11β-dichloro-1-dehydroprogesterone.

6. 6α,11β,21-trifluoro-9α-bromoprogesterone.

7. A compound selected from the group consisting of 6α-W-21-Z-9(11)-dehydroprogesterone and 6α-W-21-Z-1,9-(11)-bis-dehydroprogesterone wherein W is fluorine; and Z is halogen.

8. 6α-fluoro-21-hydroxy-4,9(11)-pregnadiene-3,20-dione 21-methanesulfonate.

9. 6α-fluoro-9α,11β-dichloro-21-iodoprogesterone.

10. 6α-fluoro-9α,11β-dichloro-21-iodo-1-dehydroprogesterone.

References Cited in the file of this patent

UNITED STATES PATENTS

| | | |
|---|---|---|
| 2,838,535 | Magerlein et al. | June 10, 1958 |
| 2,838,537 | Spero et al. | June 10, 1958 |
| 2,867,635 | Lincoln et al. | Jan. 6, 1959 |
| 2,867,636 | Lincoln et al. | Jan. 6, 1959 |
| 2,880,205 | Campbell et al. | Mar. 31, 1959 |